(12) United States Patent
Hamada (10) Patent No.: US 8,335,489 B2
(45) Date of Patent: Dec. 18, 2012

(54) MANAGEMENT DEVICE, METHOD OF CONTROLLING MANAGEMENT DEVICE, AND COMPUTER-READABLE STORAGE MEDIUM STORING THEREFOR

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 11/936,955

(22) Filed: Nov. 8, 2007

(65) Prior Publication Data

US 2008/0117847 A1    May 22, 2008

(30) Foreign Application Priority Data

Nov. 17, 2006    (JP) .................................. 2006-311617

(51) Int. Cl.
*H04M 1/66*    (2006.01)
(52) U.S. Cl. ................. 455/411; 713/159; 726/9; 726/2
(58) Field of Classification Search .......... 455/418–420, 455/411, 435.1–435.3; 726/2, 9, 21; 713/159
See application file for complete search history.

(56) References Cited

U.S. PATENT DOCUMENTS

| 7,607,015 B2* | 10/2009 | Fascenda ....................... 713/171 |
| 2003/0212894 A1* | 11/2003 | Buck et al. .................... 713/184 |
| 2005/0015467 A1 | 1/2005 | Noda |
| 2005/0029342 A1* | 2/2005 | Sugimoto et al. ............. 235/380 |
| 2005/0043019 A1 | 2/2005 | Nakamura et al. |
| 2005/0272371 A1 | 12/2005 | Komatsuzaki et al. |
| 2006/0018467 A1* | 1/2006 | Steinmetz ........................ 380/54 |
| 2006/0022816 A1* | 2/2006 | Yukawa ......................... 340/521 |
| 2006/0080734 A1* | 4/2006 | Kim et al. ........................ 726/15 |
| 2007/0143611 A1* | 6/2007 | Arroyo et al. .................. 713/171 |
| 2007/0287413 A1* | 12/2007 | Kleitsch et al. ............... 455/405 |

FOREIGN PATENT DOCUMENTS

| JP | 7-306831 A | 11/1995 |
| JP | 2000-312243 A | 11/2000 |
| JP | 2001-357020 A | 12/2001 |
| JP | 2003229872 A | 8/2003 |
| JP | 2004-013718 A | 1/2004 |
| JP | 2004007351 A | 1/2004 |
| JP | 2004013718 A * | 1/2004 |
| JP | 2004096146 A | 3/2004 |
| JP | 2005-064737 A | 3/2005 |
| JP | 2006-514471 A | 4/2006 |
| JP | 2006-135791 A | 5/2006 |

* cited by examiner

*Primary Examiner* — Patrick Edouard
*Assistant Examiner* — Ronald Eisner
(74) *Attorney, Agent, or Firm* — Canon U.S.A., Inc. IP Division

(57) ABSTRACT

Identification information used to identify a wireless-communication apparatus is acquired from a portable storage medium, a search for the wireless-communication apparatus is made based on the acquired identification information, and it is determined whether or not wireless parameters should be set to the wireless-communication apparatus according to the search result.

20 Claims, 7 Drawing Sheets

MANAGEMENT DEVICE, METHOD OF CONTROLLING MANAGEMENT DEVICE, AND COMPUTER-READABLE STORAGE MEDIUM STORING THEREFOR

BACKGROUND OF THE INVENTION

1. Field of the Invention

The present invention relates to a management device, a method of controlling the management device, and a computer-readable storage medium storing a computer-executable process causing a computer to execute the control method.

2. Description of the Related Art

For performing communications by using wireless local area networks (LANs) of Institute of Electrical and Electronics Engineers (IEEE)-802.11 series, wireless parameters including data on a communication channel, a network identifier (SSID), an encryption method, an encryption key, an authentication method, an authentication key, etc. should be set to a device. Usually, the above-described wireless parameters are set by using a user interface of the device, which is laborious. Particularly, it is difficult to input a character string including the network identifier, the encryption key, etc. to a device other than a personal computer (hereinafter referred to as a PC), where the device may be a digital camera, a printer, etc.

In recent years, therefore, technologies for easily setting the wireless parameters have been proposed. For example, methods allowing for setting the wireless parameters by using a portable storage medium have been disclosed in US2005-0272371 (corresponding to Japanese Patent Laid-Open No. 2004-007351), US2005-0015467 (corresponding to Japanese Patent Laid-Open No. 2003-229872), and US2005-0043019 (corresponding to Japanese Patent Laid-Open No. 2004-096146 and Japanese Patent Laid-Open No. 2004-013718). However, the above-described wireless-parameter setting is performed for each different network an apparatus is being connected to. For example, if wireless parameters used for a home network are set to a wireless-communication apparatus, wireless parameters used for an out-of-home network should be set to the wireless-communication apparatus for an out-of-home network.

Further, for accessing the home network from the out-of-home network, the user should set parameters other than the wireless parameters, where the parameters include data on an Internet protocol (IP) address of a gateway router used for the home network, for example.

The present invention has been achieved to easily determine whether the wireless-parameter setting should be performed.

SUMMARY OF THE INVENTION

Accordingly, the present invention allows for easily setting communication parameters to a data-processing device that can communicate with a different communication apparatus.

Further features of the present invention will become apparent from the following description of exemplary embodiments with reference to the attached drawings.

According to an aspect of the present invention, a management device includes an acquisition unit configured to acquire identification information used to identify a wireless-communication apparatus from a portable storage medium, a search unit configured to search for the wireless-communication apparatus based on the acquired identification information, and a determination unit configured to determine whether or not wireless parameters are set to the wireless-communication apparatus according to a result of the search.

According to another aspect of the present invention, a method of controlling a management device is provided. The control method includes the steps of acquiring identification information used to identify a wireless-communication apparatus from a portable storage medium, searching for the wireless-communication apparatus based on the acquired identification information, and determining whether not wireless parameters are set to the wireless-communication apparatus according to a result of the search.

DESCRIPTION OF THE EMBODIMENTS

Hereinafter, embodiments of the present invention will be described with reference to the attached drawings.

Figure 1:
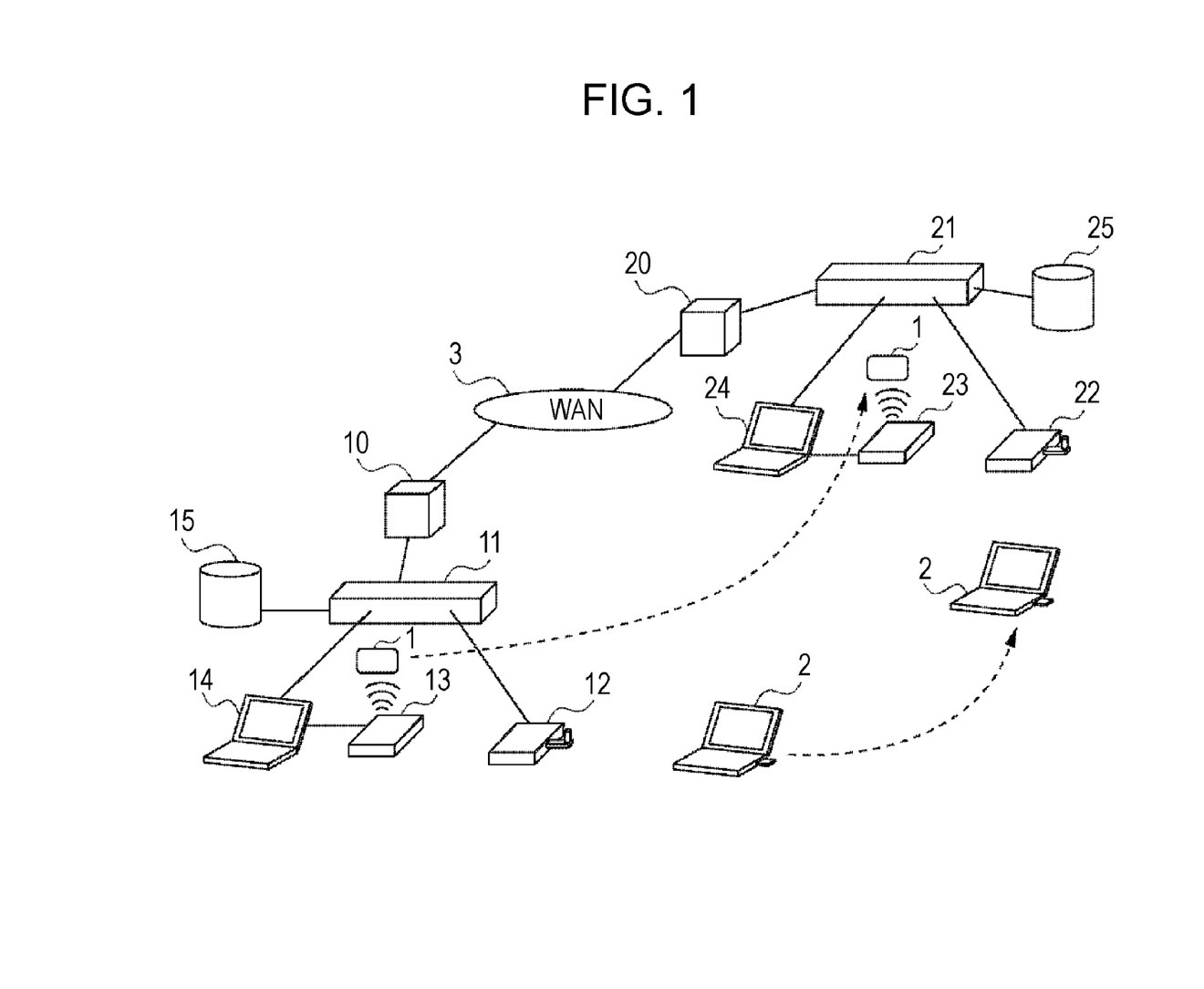
FIG. 1 illustrates the configuration of a system according to an embodiment of the present invention.

FIG. 1 illustrates the configuration of a system according to an embodiment of the present invention. A home network includes a gateway router 10, a hub switch 11, a wireless-base-station device (access point abbreviated as AP) 12, an NFC reader/writer 13, a management device 14, and a media server 15. An out-of-home network includes a gateway router 20, a hub switch 21, an AP 22, an NFC reader/writer 23, a management device 24, and a media server 25.

The gateway router 10 is used for the home network, and the gateway router 20 is used for the out-of-home network. The hub switch 11 is used for the home network, and the hub switch 21 is used for the out-of-home network. The media server 15 is used for the home network and the media server 25 is used for the out-of-home network.

Each of the APs 12 and 22 has the function of wireless LANs of IEEE-802.11 series. Each of the APs 12 and 22 functions, as an interface between a wireless network and a wired network, controls a wireless signal, encrypts wireless data transmitted and/or received, authenticates a wireless-communication apparatus making a request to access, etc. Here, the term "IEEE 802.11" of the wireless LANs of IEEE-802.11 series indicates wireless-LAN standards including IEEE 802.11a, IEEE 802.11b, IEEE 802.11g, IEEE 802.11n, etc.

Each of the management devices 14 and 24 manages each of wireless parameters, network-access parameters, and network-application parameters, and presents the above-described parameters to a wireless-communication apparatus. The management device 14 provided for the home network is set, so as to recognize that the management device 14 is designed for home use.

The wireless parameters are related to a wireless-media layer and provided to perform wireless communications by using the wireless LANs of IEEE 802.11-series. The wireless parameters include data on a network identifier (SSID), an encryption key, an authentication method, an encryption method, etc.

The network-access parameters are related to a network-access layer and provided to logically connect to a different device. The use of the network-access parameters allows for getting remote access from the out-of-home network to the home network. The network-access parameters may be the IP address of the gateway router 10, a password used to set Virtual Private Network (VPN) connected to the gateway router 10, etc.

The network-application parameters are related to a network-application layer and provided to use a file-transfer application, a stream-data-reproduction application, etc. The use of the above-described parameters allows for using an arbitrary application provided on the home network from the out-of-home network. The network-application parameters may be the IP address of the media server 15 provided for the home network, an authentication password provided to access the media server 15, etc.

A nonvolatile-storage media 1 is configured to store identification information of a wireless-communication apparatus to which various parameters are set, authentication information (an authentication password) used to set wireless parameters, etc. Although a Near Field Communication (NFC) card is used in the above-described embodiment, as the nonvolatile media, other media may be used.

Each of the NFC reader/writer 13 and the NFC reader/writer 23 reads and/or writes data from and/or into an NFC card 1. If the NFC card 1 is held over the NFC reader/writer 13 (23), the NFC reader reads various information stored in the NFC card 1, and transmits the read information to the management device 14 (24). Thus, the management device 14 (24) can acquire information stored in the NFC card 1. Further, when the management device 14 (24) transmits an instruction to write information to the NFC reader/writer 13 (23), the NFC writer writes the information into the NFC card 1 according to the instruction. In FIG. 1, the NFC reader/writer 13 and the NFC reader/writer 23 are connected to the management device 14 and the management device 24, respectively. However, the NFC reader/writer 13 and the NFC reader/writer 23 may be included in the management device 14 and the management device 24, respectively.

A wireless-communication apparatus 2 includes the wireless-LANs-of-IEEE-802.11-series function and is able to access a network system via the AP 12 and/or the AP 22. The wireless-communication apparatus 2 stores set wireless parameters and connects to the AP 12 and/or the AP 22 by using the stored wireless parameters.

A wide-area network (WAN) 3 is provided to connect the above-described home network to the above-described out-of-home network.

When the NFC card 1 is held over the NFC reader/writer 13 (23) in the above-described system, parameters related to a multiple layer are set to the wireless-communication apparatus 2, where the parameters includes the wireless parameters, the network-access parameters, etc.

Figure 2:
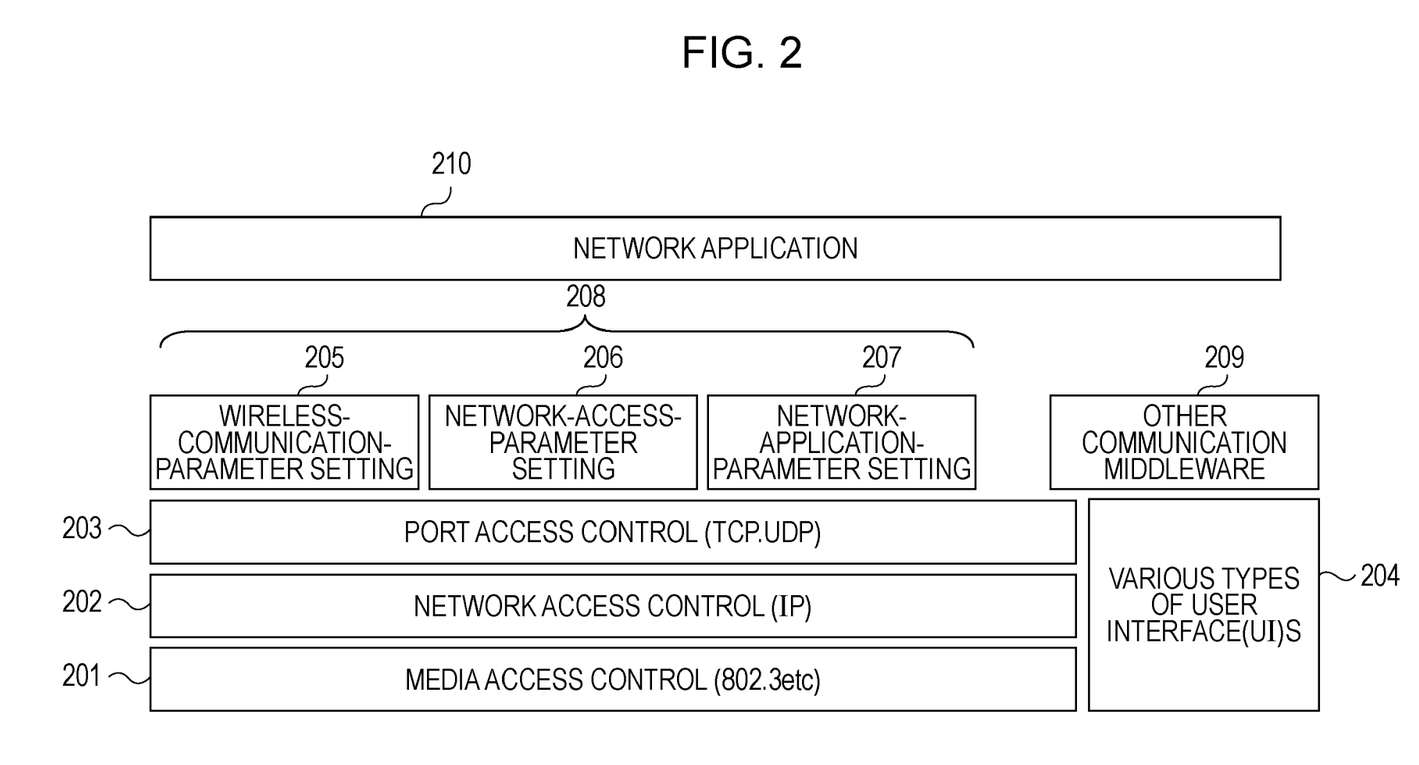
FIG. 2 illustrates functional layers of each of management devices 14 and 24.
Figure 7:
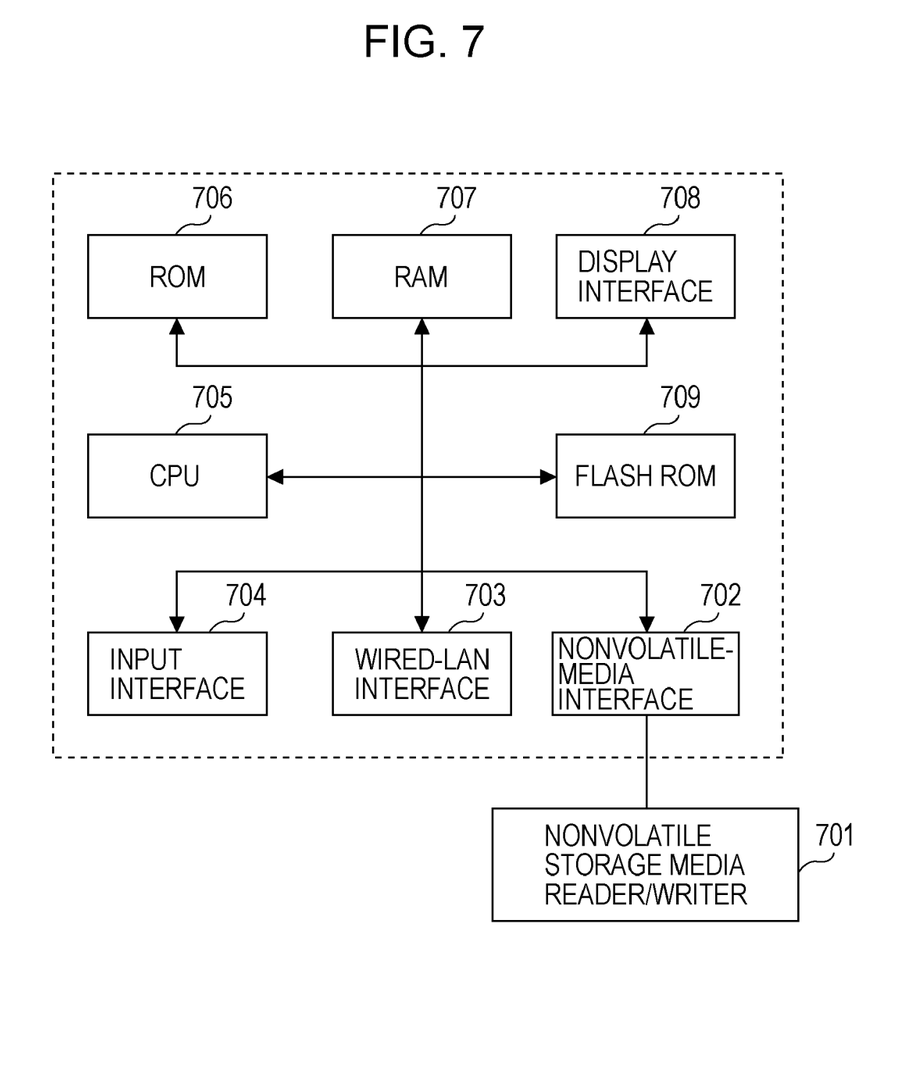
FIG. 7 is a functional block diagram of each of the management devices 14 and 24.

FIG. 2 is the functional-layer diagram of each of the management devices 14 and 24, and FIG. 7 is the functional-block diagram of each of the management devices 14 and 24.

Reference numeral 201 indicates a function unit configured to perform control for Media Access Control (MAC). Reference numeral 202 indicates a function unit configured to perform control for Network Access Control (Internet Protocol: IP). Reference numeral 203 indicates a function unit configured to perform control for Port Access Control (TCP, UDP). Reference numeral 204 indicates a function unit configured to perform control for various types of User Interfaces (UIs). A network-setting-middleware group 208 is contained in a communication-middleware layer. A functional unit 205 is configured to set the wireless parameters provided to perform wireless communications by using the wireless LANs of IEEE-802.11 series. Reference numeral 209 indicates a function unit configured to perform control for other communication middleware layers. Reference numeral 210 indicates a function unit configured to perform control for a network application.

A functional unit 206 is configured to set the network-access parameters provided to get remote access from the out-of-home network to the home network, for example.

A functional unit 207 is configured to set the network-application parameters provided to use an application configured to transfer file data, reproduce stream data, etc.

A reader/writer 701 is used for a nonvolatile media including an NFC or the like. In this embodiment, the reader/writer 701 is an NFC reader/writer. A nonvolatile-media interface 702 is provided to connect to the NFC reader/writer 13 and/or the NFC reader/writer 23. A wired-LAN interface 703 is provided to connect to a different device via a wired LAN. An input interface 704 is provided so that a user can transmit various types of instructions therethrough.

Further, a central-processing unit (CPU) 705, a read-only memory (ROM) 706, and a random-access memory (RAM) 707 are provided. A display interface 708 is provided to display various images.

A flash ROM 709 is provided to store the information used to identify the wireless-communication apparatus to which the wireless parameters are set. Further, the management device 14 (24) can acquire the network-access parameters, the network-application parameters, etc. available on a network to which the management device 14 (24) belongs by using, for example, a Universal-Plug-and-Play (UPnP) function. The acquired information is stored in the flash ROM 709. If the network-access parameters and the network-application parameters are changed due to a new device connected to the network, for example, the latest information is stored in the flash ROM 709.

Each of functional units illustrated in the functional-layer diagram of FIG. 2 operates under the control of the CPU 705. An operation program illustrated in FIG. 3 is stored in the ROM 706 and/or the flash ROM 709, and the CPU 705 performs processing according to the operation program as described below.

Figure 3:
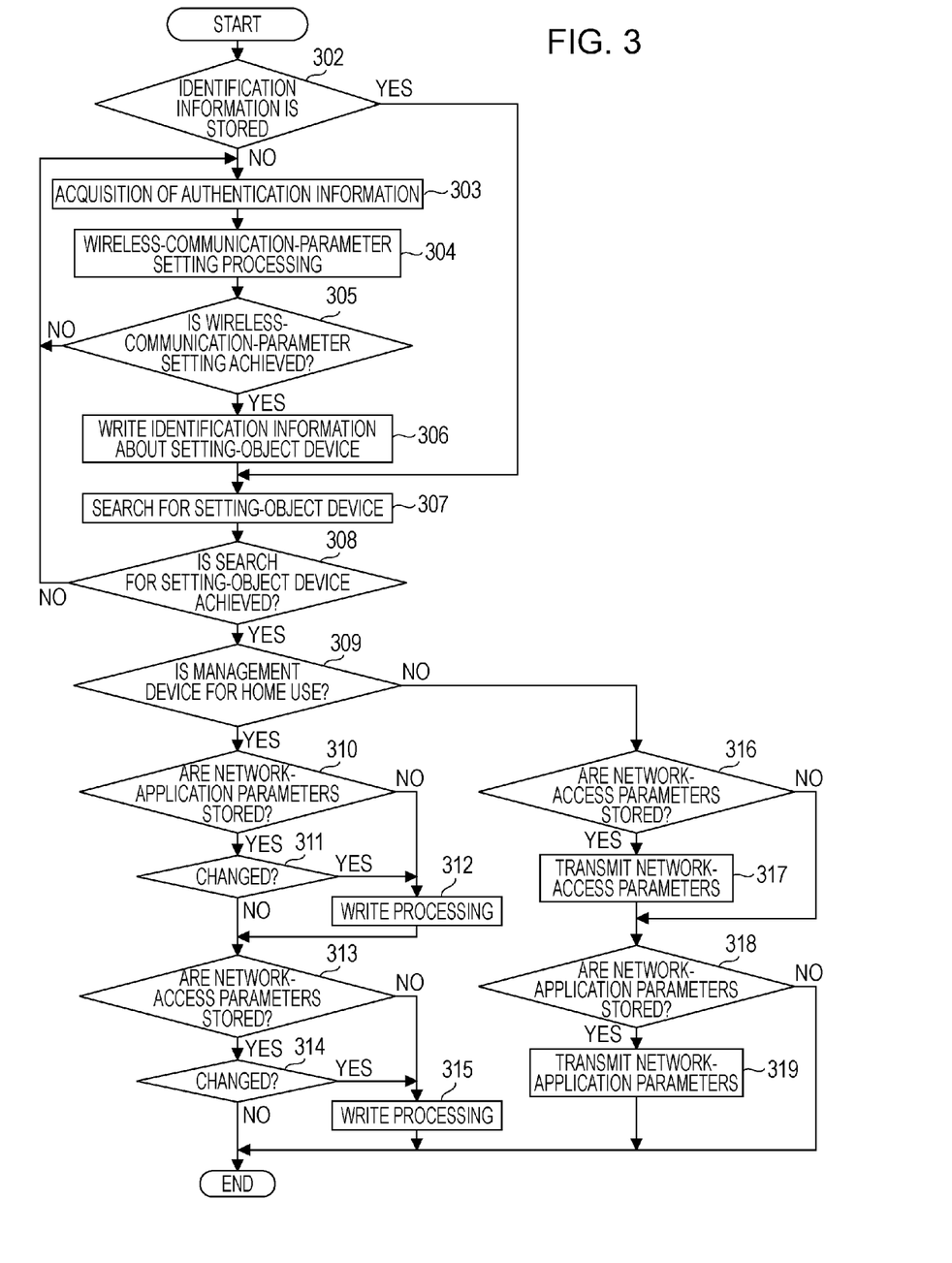
FIG. 3 illustrates the flow of operations performed by each of the management devices 14 and 24.

The operation program illustrated in FIG. 3 may be obtained via the wired-LAN interface 703 and/or the nonvolatile-storage-media interface 702. The obtained operation program may be unarchived into the RAM 707 and/or stored in the flash ROM 709.

In a use case according to the present embodiment, the NFC card 1 and the wireless-communication apparatus 2 may be sold in the same package. In that case, the NFC card 1 stores authentication information (password) used to authenticate the wireless-communication apparatus 2 to set the wireless parameters.

Figure 4:
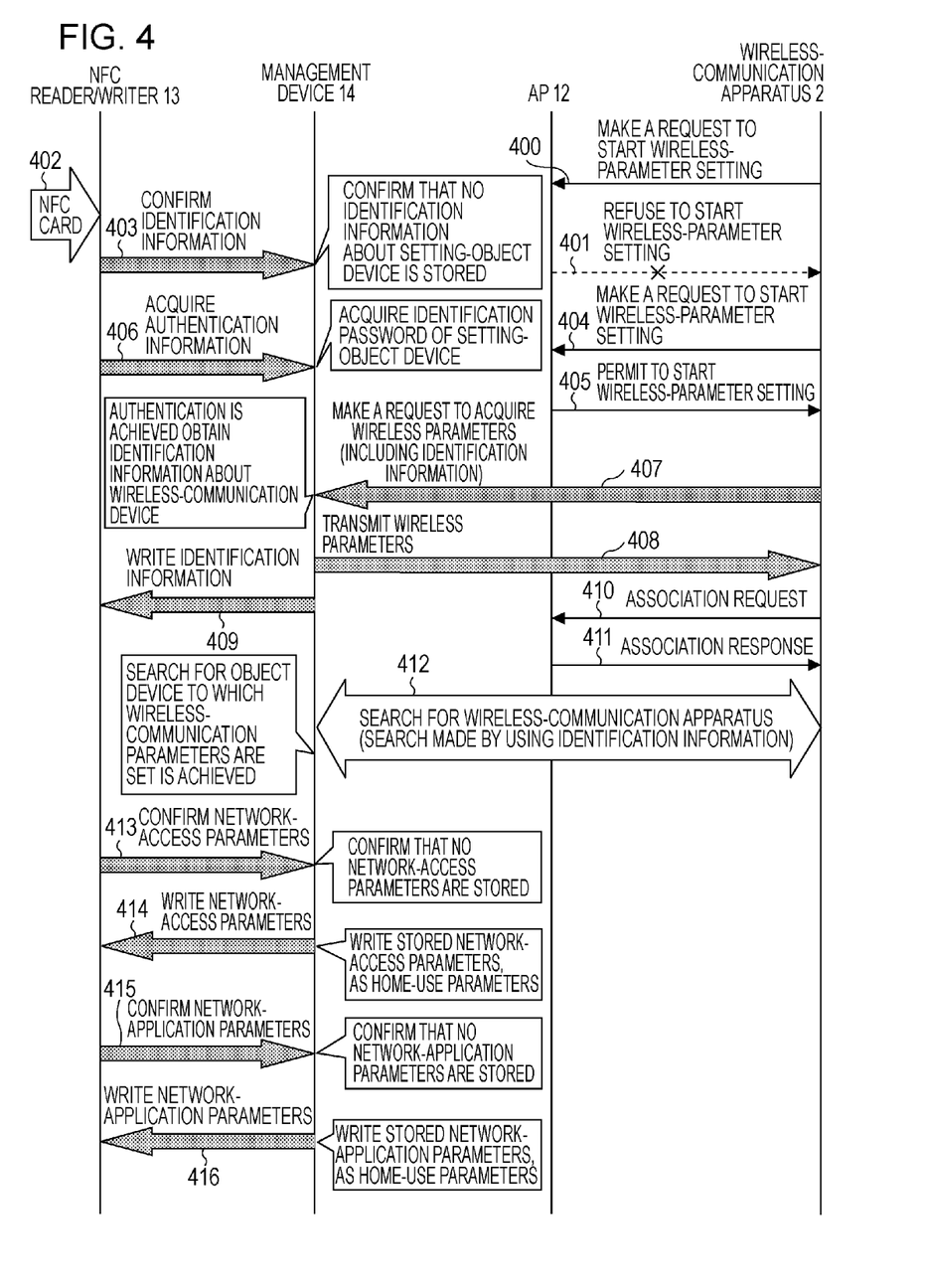
FIG. 4 illustrates sequences executed when the first parameter setting is performed.
Figure 5:
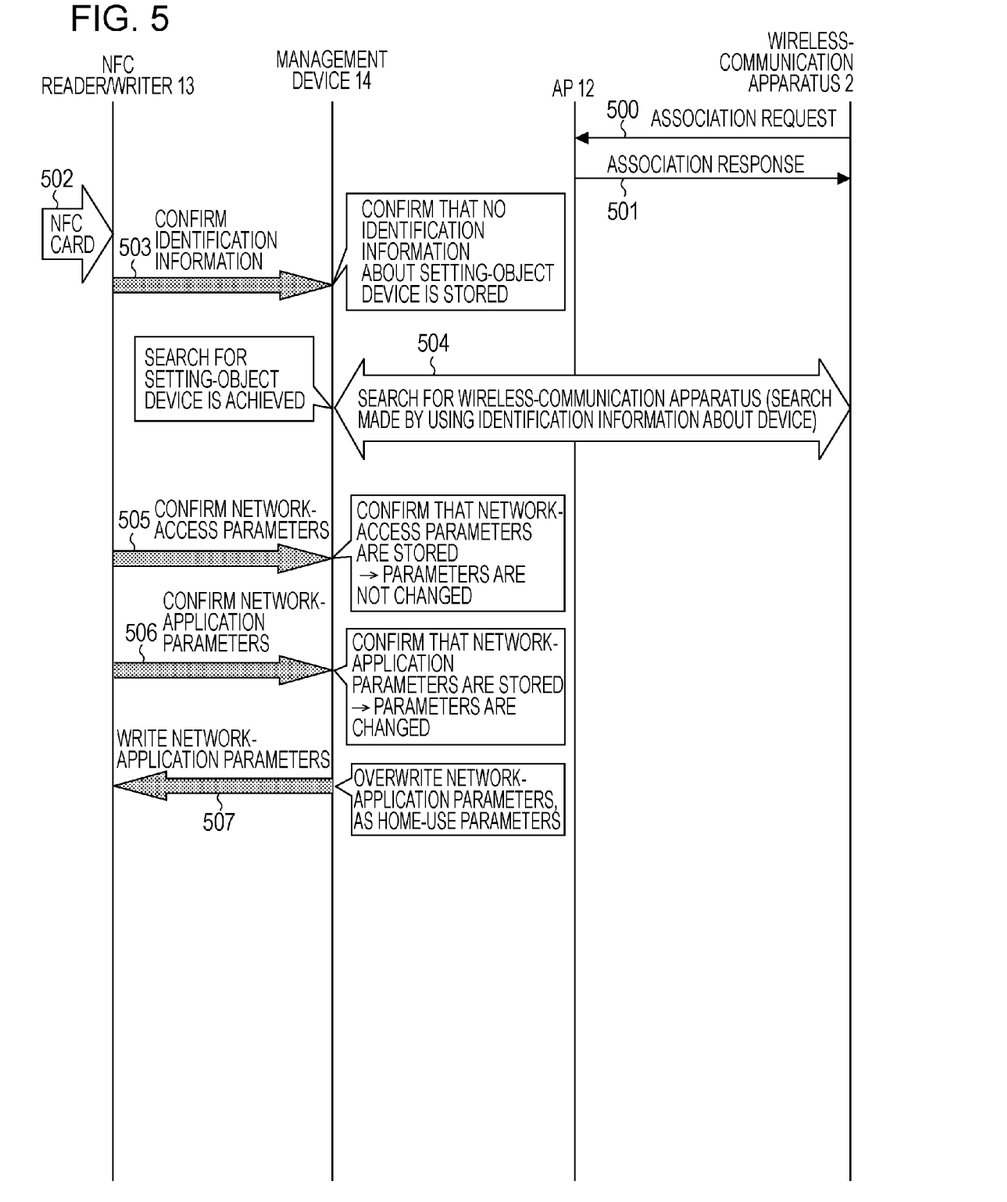
FIG. 5 illustrates sequences executed when an NFC card is held over an NFC reader/writer at home after the first-parameter setting is performed.
Figure 6:
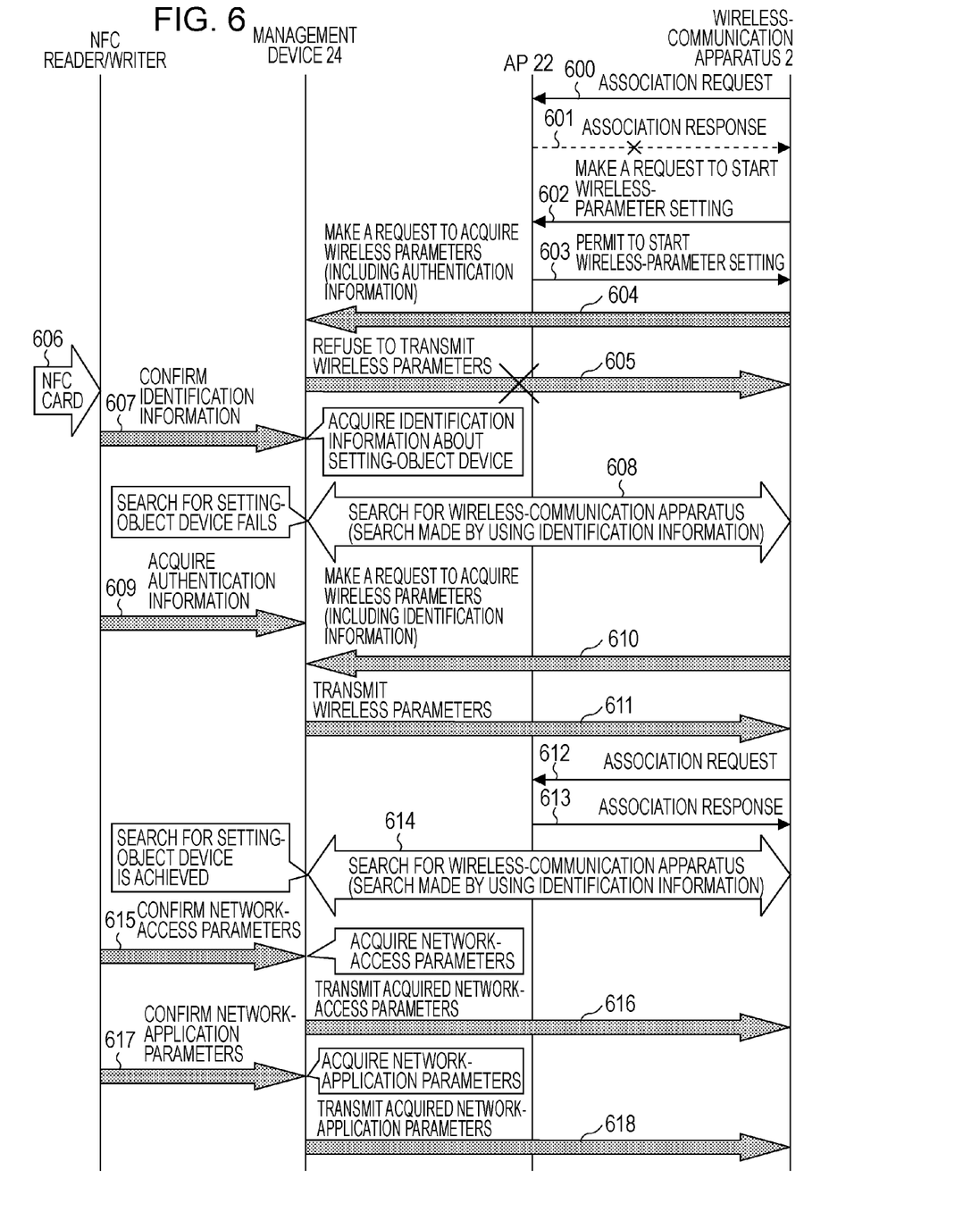
FIG. 6 illustrates sequences executed when the NFC card is held over another NFC reader/writer out of home after the first parameter setting is performed.

FIG. 3 illustrates the flow of operations performed by each of the management devices 14 and 24. FIG. 4 illustrates sequences executed to set various types of parameters (for the first time) by holding the NFC card 1 over the NFC reader/writer 13 at home for the first time after purchasing the NFC card 1 and the wireless-communication apparatus 2. FIG. 5 illustrates sequences executed when the NFC card 1 is held over the NFC reader/writer 13 at home after the first-parameter setting is performed. FIG. 6 illustrates 502 sequences executed when the NFC card 1 is held over the NFC reader/writer 23 out of home after the first-parameter setting is performed.

First, the flow of operations performed by the management device 14 and sequences executed by each of the units at the first-parameter-setting time will be described with reference to FIGS. 3 and 4.

First, operations of the wireless-communication apparatus 2 will be described.

When being instructed to start wireless connection, the wireless-communication apparatus 2 tries to associate with the AP by using the wireless parameters stored in the wireless-communication apparatus 2. Here, the association denotes establishing the connection between the wireless-communication apparatus 2 and the AP. The wireless-communication apparatus 2 transmits an association request to the AP and receives an association response (success) transmitted from the AP within a predetermined time period, whereby the association is achieved. Upon receiving an association response other than the association response (success) and/or no association response within the predetermined time period, the wireless-communication apparatus 2 determines that the association is not achieved.

If the wireless parameters are not yet stored in the wireless-communication apparatus 2, and the association is not performed or ends in failure, the wireless-communication apparatus 2 transmits a request to start setting the wireless parameters to the AP. Upon receiving a wireless-parameter-setting-start permit transmitted from the AP, the wireless-communication apparatus 2 starts setting the wireless parameters between the wireless-communication apparatus 2 and the management device, as described later.

If no wireless-parameter-setting-start permit is transmitted from the AP, the wireless-communication apparatus 2 transmits the wireless-parameter-setting-start request to the AP again after a lapse of predetermined time. Thus, the wireless-communication apparatus 2 repeats the above-described processing until the wireless-parameter setting is achieved. If the predetermined time lapses even though the wireless-parameter setting is not achieved, or the wireless-parameter setting ends in failure a predetermined number of times, the wireless-communication apparatus 2 stops the above-described processing.

At the first-parameter-setting time, the wireless parameters are not stored in the wireless-communication apparatus 2. Therefore, the wireless-communication apparatus 2 does not associate with the AP 12, and transmits the wireless-parameter-setting-start request to the AP 12 (400 of FIG. 4). Here, the AP 12 transmits information indicating refusal to start the wireless-parameter setting (401 of FIG. 4). Subsequently, the wireless-communication apparatus 2 transmits the wireless-parameter-setting-start request to the AP 12 again after a lapse of predetermined time (404 of FIG. 4). Here, the AP 12 transmits the wireless-parameter-setting-start permit to the wireless-communication apparatus 2 (405 of FIG. 4).

If the NFC card 1 is held over the NFC reader/writer 13 at that time (402 of FIG. 4), the NFC reader reads information stored in the NFC card 1 and transmits the read information to the management device 14. Then, the management device 14 checks whether the identification information is stored in the NFC card 1 (step 302 of FIG. 3 and 403 of FIG. 4).

Since the identification information is not stored after the first-parameter setting is performed (No at step 302), the management device 14 acquires authentication information provided to set the wireless parameters to the wireless-communication apparatus 2 from the NFC card 1 (step 303 of FIG. 3 and 406 of FIG. 4). Then, the management device 14 starts performing the wireless-parameter setting between the management device 14 and the wireless-communication apparatus 2 (step 304 of FIG. 3).

Upon receiving the wireless-parameter-setting-start permit (405 of FIG. 4), the wireless-communication apparatus 2 connects to the AP 12 wirelessly and temporarily by using an SSID (network identifier) included in the wireless-parameter-setting-start permit (405). After the temporary wireless connection is established, it becomes possible to communicate with the management device 14 via the AP 12 by using a specifically designed packet even though the wireless parameters including the encryption key, etc., are not set to the wireless-communication apparatus 2.

Then, the wireless-communication apparatus 2 transmits a request to acquire the wireless parameters to the management device 14 via the AP 12 (407 of FIG. 4). The wireless-parameter-acquisition request includes identification information (Media Access Control (MAC) address, a Universally Unique Identifier (UUID), etc.) used to identify the wireless-communication apparatus 2, and the management device 14 primarily stores the identification information into the flash ROM 709.

The wireless-parameter-acquisition request also includes authentication information used to authenticate the wireless-communication apparatus 2, and the management device 14 compares the authentication information to the authentication information acquired from the NFC card 1. Since the NFC card 1 stores the authentication information used to authenticate the wireless-communication apparatus 2, as described above, the authentication information agrees with that acquired from the NFC card 1. Subsequently, the management device 14 transmits the wireless parameters (the encryption key, the authentication method, and the encryption method) used to connect to the AP 12 to the wireless-communication apparatus 2 (408 of FIG. 4). Then, the wireless-communication apparatus 2 stores and sets the transmitted wireless parameters, as the wireless parameters of the home network.

After that, the wireless-communication apparatus 2 transmits an association request to the AP 12 (410 of FIG. 4) and receives an association response (success) transmitted from the AP 12 (411 of FIG. 4), whereby the association is completed. After the association is completed, the wireless-communication apparatus 2 acquires an internet Protocol (IP) address by asking a Dynamic-Host-Configuration-Protocol (DHCP) server, for example. Subsequently, IP communications can be performed between the wireless-communication apparatus 2 and other devices provided on the network.

If the wireless-parameter setting is achieved (Yes at step 305 of FIG. 3), the management device 14 instructs the NFC reader/writer 13 to write the identification information used to identify the wireless-communication apparatus 2 into the NFC card 1, where the identification information is primarily stored in the flash ROM 709 (step 306 of FIG. 3 and 409 of FIG. 4). Here, when the identification information is written into the NFC card 1, the management device 14 prohibits the NFC reader/writer 13 from overwriting the identification information. Then, the NFC writer writes the identification information into the NFC card 1 according to the instruction transmitted from the management device 14.

Next, the management device 14 searches for the wireless-communication apparatus 2 by using the identification information primarily stored in the flash ROM 709 (step 307 of FIG. 3 and 412 of FIG. 4). Subsequently, the management device 14 can determine whether the IP communications are established between the management device 14 and the wireless-communication apparatus 2.

A protocol used to make the search may be the Simple Service Discovery Protocol (SSDP) of the UPnP. However, other methods may be used. For example, if the wireless-communication apparatus 2 for which the search is made is provided with a Reverse-ARP (RARP)-server function, the RARP may be used, as the protocol. Further, the AP 12 is provided with a management table used to manage the correspondence relationship between the MAC address and the IP address of an associated wireless-communication device. Therefore, the management device 14 may ask the AP 12 whether or not the wireless-communication apparatus 2 is registered with the management table.

Here, the wireless-communication association is achieved and established between the wireless-communication apparatus 2 and the AP 12, and the wireless-communication apparatus 2 acquires the IP address. Therefore, the management device 14 can achieve the search for the wireless-communication apparatus 2 (Yes at step 308 of FIG. 3).

Next, the management device 14 determines whether the management device 14 is designed for home use (step 309 of FIG. 3). Since the management device 14 is designed for home use (Yes at step 309 of FIG. 3), the processing advances to step 310. The management device 14 confirms whether the network-access parameters are stored in the NFC card 1 (step 310 of FIG. 3 and 413 of FIG. 4). The network-access parameters may be the IP address of the gateway router 10, the password used to set the VPN connected to the gateway router 10, etc., as described above.

After the first-parameter setting is performed, the network-access parameters are not stored in the NFC card 1 (No at step 310). Therefore, the management device 14 instructs the NFC reader/writer 13 to write the network-access parameters of the home network into the NFC card 1, where the network-access parameters are stored in the flash ROM 709 (step 312 of FIG. 3 and 414 of FIG. 4). The NFC writer writes the network-access parameters into the NFC card 1 according to the instruction transmitted from the management device 14. Thus, the network-access parameters used to get remote access from the out-of-home network to the home network are stored in the NFC card 1.

Next, the management device 14 confirms whether or not the network-application parameters are stored in the NFC card 1 (step 313 of FIG. 3 and 415 of FIG. 4). The network-application parameters may be the IP address of the media server 15 provided in the home network, the authentication password used to access the media server 15, etc., as described above.

After the first-parameter setting is performed, the network-application parameters are not stored in the NFC card 1 (No at step 313). Therefore, the management device 14 instructs the NFC reader/writer 13 to write the network-application parameters of the home network into the NFC card 1 (step 315 of FIG. 3 and 416 of FIG. 4), where the network-application parameters are stored in the flash ROM 709. The NFC writer writes the network-application parameters into the NFC card 1 according to the instruction transmitted from the management device 14. Thus, the network-application parameters provided to use an application provided on the home network from the out-of-home network are stored in the NFC card 1.

Thus, when the first-parameter setting is performed, the NFC card 1 is held over the NFC reader/writer 13 so that the wireless parameters can be set to the wireless-communication apparatus 2 and the identification information used to identify the wireless-communication apparatus 2 can be written into the NFC card 1. Further, the network parameters and the network-application parameters of the home network can be written into the NFC card 1.

Next, FIGS. 3 and 5 illustrate the flow of operations performed by the management device 14 and sequences executed by each of the units when the NFC card 1 is held over the NFC reader/writer 13 at home after the first parameter setting is achieved.

When being instructed to start the wireless connection, the wireless-communication apparatus 2 transmits an association request to the AP 12 by using wireless parameters designed for home use, where the home-use wireless parameters are stored in the wireless-communication apparatus 2 (500 of FIG. 5). Upon receiving an association response (success) transmitted from the AP 12 (501 of FIG. 5), the association is completed. After that, the wireless-communication apparatus 2 acquires an IP address by asking the DHCP server, for example. Subsequently, the IP communications can be performed between the wireless-communication apparatus 2 and other devices provided on the network.

Here, when the NFC card 1 is held over the NFC reader/writer 13 (502 of FIG. 5), the NFC reader reads information stored in the NFC card 1 and transmits the read information to the management device 14. Then, the management device 14 checks whether or not the identification information is stored in the NFC card 1 (step 302 of FIG. 3 and 503 of FIG. 5).

Since the identification information is stored after the first parameter setting is achieved (Yes at step 302 of FIG. 3), the management device 14 searches for the wireless-communication apparatus 2 by using the identification information, so as to determine whether or not the IP communications are established between the management device 14 and the wireless-communication apparatus 2 (step 307 of FIG. 3 and 504 of FIG. 5). In that case, the wireless-communication association was established between the wireless-communication apparatus 2 and the AP 12, and the IP address was acquired by the wireless-communication apparatus 2. Therefore, the management device 14 succeeds in searching for the wireless-communication apparatus 2 (Yes at step 308 of FIG. 3).

Next, the management device 14 determines whether or not the management device 14 is designed for home use (step 309 of FIG. 3). Since the management device 14 is designed for home use (Yes at step 309 of FIG. 3), the processing advances to step 310 of FIG. 3.

The management device 14 confirms whether the network-access parameters are stored in the NFC card 1 (step 310 of FIG. 3 and 505 of FIG. 5). Since the network-access parameters of the home network are stored in the NFC card 1 (Yes at step 310 of FIG. 3), the management device 14 determines whether information stored in the NFC card 1 should be changed (step 311 of FIG. 3). Namely, it is confirmed whether the network-access parameters stored in the NFC card 1 agree with those stored in the flash ROM 709 of the management device 14. If the network-access parameters stored in the NFC card 1 do not agree with those stored in the flash ROM 709, it is determined that the information stored in the NFC card 1 should be changed. When the network-access parameters stored in the NFC card 1 do not agree with those stored in the flash ROM 709, the IP address of the gateway router 10 is changed, for example, due to a change in the network configuration. In the present embodiment, however, it is determined that no change occurred (No at step 311 of FIG. 3), so that the processing advances to step 313 of FIG. 3.

Next, the management device 14 confirms whether the network-application parameters are stored in the NFC card 1 (step 313 of FIG. 3 and 506 of FIG. 5). Here, since the network-application parameters of the home network are stored in the NFC card 1 (Yes at step 313 of FIG. 3), the management device 14 determines whether the information stored in the NFC card 1 should be changed (step 314 of FIG. 3). Namely, it is confirmed whether the network-application parameters stored in the NFC card 1 agree with those stored in the flash ROM 709 of the management device 14. If the network-application parameters stored in the NFC card 1 do not agree with those stored in the flash ROM 709, it is determined that the information stored in the NFC card 1 should be changed.

The above-described disagreement may occur, for example, when another printer is connected to the home network so that the IP address of the printer and an authentication password provided to access the printer are added. In the present embodiment, the network-application parameters are changed (Yes at step 314 of FIG. 3). Then, the management device 14 instructs the NFC reader/writer 13 to write the network-application parameters stored in the flash ROM 709 into the NFC card 1 (step 315 of FIG. 3 and 507 of FIG. 5). The NFC writer overwrites the network-application parameters stored in the NFC card 1 according to the instruction transmitted from the management device 14.

Thus, when the NFC card 1 is held over the NFC reader/writer 13 at home after the first parameter setting is performed, the wireless-parameter setting is not performed. Further, when the network-access parameters and the network-application parameters that are provided for the home network are changed, information about the change is written into the NFC card 1. Therefore, new information about the home network can be written into the NFC card 1 without performing unnecessary parameter setting.

Next, FIGS. 3 and 6 illustrate the flow of operations performed by the management device 24 and sequences executed by each of the units when the NFC card 1 is held over the NFC reader/writer 13 out of home after the first parameter setting is achieved.

When being instructed to start the wireless connection, the wireless-communication apparatus 2 transmits an association request to the AP 22 by using wireless parameters provided for home use, where the home-use wireless parameters are stored in the wireless-communication apparatus 2 (600 of FIG. 6). Since wireless parameters provided for the out-of-home network are set to the AP 22, it is difficult for the wireless-communication apparatus 2 to receive an association response (success) (601 of FIG. 6), so that it is determined that association is not achieved.

Therefore, the wireless-communication apparatus 2 transmits a wireless-parameter-setting-start request to the AP 22 (602 of FIG. 6). Upon receiving a wireless-parameter-setting-start permit transmitted from the AP 22 (603 of FIG. 6), the wireless-communication apparatus 2 connects to the AP 22 wirelessly and temporarily by using an SSID included in the wireless-parameter-setting-start permit. After the temporary wireless connection is established, it becomes possible to communicate with the management device 14 via the AP 12 by using a specifically designed packet even though wireless parameters including an encryption key or the like are not set to the wireless-communication apparatus 2. Then, the wireless-communication apparatus 2 transmits a request to acquire the wireless parameters to the management device 24 via the AP 22 (604 of FIG. 6). Here, the wireless-parameter-acquisition request includes authentication information.

At that time, no authentication information is acquired from the NFC card 1. Therefore, it is difficult for the management device 24 to authenticate the wireless-communication apparatus 2. Subsequently, the management device 24 transmits information indicating refusal to transmit the wireless parameters to the wireless-communication apparatus 2 (605 of FIG. 6).

Then, the NFC card 1 is held over the NFC reader/writer 23 (606 of FIG. 6), and the NFC reader reads information stored in the NFC card 1, and transmits the read information to the management device 24. Then, the management device 24 checks whether or not identification information is stored in the NFC card 1 (step 302 of FIG. 3 and 607 of FIG. 6).

Since the identification information is stored after the first parameter setting is achieved (Yes at step 302 of FIG. 3), the management device 24 searches for the wireless-communication apparatus 2 by using the identification information, so as to determine whether or not the IP communications are established between the management device 24 and the wireless-communication apparatus 2 (step 307 of FIG. 3 and 608 of FIG. 6).

Since the wireless parameters provided for the out-of-home network are not set to the wireless-communication apparatus 2 and association with the AP 22 is not achieved, the management device 24 fails to search for the wireless-communication apparatus 2 (No at step 308 of FIG. 3) so that the processing returns to step 303 of FIG. 3.

The management device 24 acquires the authentication information provided to set the wireless parameters used for the out-of-home network from the NFC card 1 (step 303 and 609 of FIG. 6). Then, the management device 24 starts wireless-parameter setting between the management device 24 and the wireless-communication apparatus 2 (step 304 of FIG. 3).

Upon receiving the wireless-parameter-transmission refusal (605 of FIG. 6), the wireless-communication apparatus 2 transmits the wireless-parameter-acquisition request to the management device 24 again after a lapse of predetermined time (610 of FIG. 6). The management device 24 compares the authentication information included in the wireless-parameter-acquisition request to that acquired from the NFC card 1. Since the authentication information used to authenticate the wireless-communication apparatus 2 is stored in the NFC card 1, as described above, the authentication information included in the wireless-parameter-acquisition request agrees with that acquired from the NFC card 1. Therefore, the management device 24 transmits the wireless parameters (the encryption key, the authentication method, and the encryption method) provided to connect to the AP 22 to the wireless-communication apparatus 2 (611 of FIG. 6). Then, the wireless-communication apparatus 2 stores and sets the transmitted wireless parameters, as the wireless parameters used for the out-of-home network.

After that, the wireless-communication apparatus 2 transmits an association request to the AP 22 (612 of FIG. 6), and receives an association response (success) transmitted from the AP 22 (613 of FIG. 6), whereby the association is completed. After the association is completed, the wireless-communication apparatus 2 acquires an IP address by asking the HCP server, for example. Subsequently, the IP communications can be established between the wireless-communication apparatus 2 and other devices provided on the network.

After the wireless-parameter setting is achieved (Yes at step 305 of FIG. 3), the processing advances to step 306 of FIG. 3. Here, since the identification information used to identify the wireless-communication apparatus 2 had already been stored in the NFC card 1, as described above, and overwriting of the identification information is prohibited, the identification-information writing (step 306 of FIG. 3) is not performed.

Next, the management device 24 searches for the wireless-communication apparatus 2 again by using the identification information acquired from the NFC card 1 (step 307 of FIG. 3 and 614 of FIG. 6). After the wireless parameters are set, the wireless-communication association is established between the wireless-communication device 2 and the AP 22, and the wireless-communication apparatus 2 acquires the IP address. Therefore, the management device 24 succeeds in searching for the wireless-communication apparatus 2 (Yes at step 308 of FIG. 3).

Next, the management device 24 determines whether the management device 24 is designed for home use (step 309 of FIG. 3). Since the management device 24 is not designed for home use (No at step 309), the processing advances to step 316 of FIG. 3.

The management device 24 confirms whether the network-access parameters are stored in the NFC card 1 (step 316 of FIG. 3 and 615 of FIG. 6). Here, the network-access parameters of the home network are stored in the NFC card 1 (Yes at step 316 of FIG. 3). Therefore, the network-access parameters are transmitted to the wireless-communication apparatus 2 (step 317 of FIG. 3 and 616 of FIG. 6). The wireless-communication apparatus 2 can access the home network from the out-of-home network by using the transmitted network-access parameters.

Next, the management device 24 confirms whether the network-application parameters are stored in the NFC card 1 (step 318 of FIG. 3 and 617 of FIG. 6). Here, the network-application parameters of the home network are stored in the NFC card 1 (Yes at step 318 of FIG. 3). Therefore, the network-application parameters are transmitted to the wireless-communication apparatus 2 (step 319 of FIG. 3 and 618 of FIG. 6). The wireless-communication apparatus 2 can easily use an application available on the home network even though the wireless-communication apparatus 2 is out of home.

If the management device 24 receives the wireless-parameter-acquisition request transmitted from the wireless-communication apparatus 2 (610 of FIG. 6) before making the search (608 of FIG. 6), the management device 24 performs the wireless-parameter setting without making the search.

Thus, when the NFC card 1 is held over the NFC reader/writer 23 out of home after the first parameter setting is performed, the wireless-parameter setting, the network-access-parameter setting, and the network-application-parameter setting are performed.

Thus, according to the present embodiment, necessary parameters can be set in each of the layers by performing the same operation, that is, holding the NFC card 1 over the NFC reader/writer either at home or out of home.

Further, at the first-parameter-setting time, the identification information of the wireless-communication device 2, where the identification information is acquired during the wireless-parameter setting, the network-access parameters, and the network-application parameters can be stored in the NFC card 1.

Further, the management device can determine whether the wireless-parameter setting should be performed by making the search by using the identification information stored in the NFC card at the first-parameter-setting time. If the wireless-parameter setting should not be performed, the wireless-parameter setting is not performed. Therefore, the processing time and the load placed on the management device can be reduced.

Further, when the network-access parameters and the network-application parameters that are designed for the home network are changed, new information can be written into the NFC card, as required, by holding the NFC card over the NFC reader/writer.

Still further, even though the user is out of home, the user can remotely access the home network and use an application available on the home network by performing a simple operation, that is, holding the NFC card over the NFC reader/writer.

According to the present embodiment, the identification information used to identify the wireless-communication apparatus 2 is written into the NFC card 1 at the first-parameter-setting time. However, the identification information may be stored in the NFC card 1 in advance. In that case, the answer of the step 302 in FIG. 3 becomes Yes and the management device immediately starts making the search (step 307 of FIG. 3) by using the identification information acquired from the NFC card 1.

Further, the network-application parameters necessary for the wireless-parameter apparatus may be stored in the NFC card in advance so that the network-application parameters are set. Subsequently, it becomes possible to use an application necessary for the user from the out-of-home network with facility and speed.

Further, according to the present embodiment, the network-access parameters and the network-application parameters are set. However, the network-application parameters may not be set. When the network-access parameters are set, the wireless-communication apparatus can access the home network from the out-of-home network. Therefore, the network-application parameters can be acquired according to another method. However, by acquiring the network-application parameters stored in the NFC card from the management device, the application available on the home network can be used with speed and stability.

Further, according to the present embodiment, parameters of a wireless-media layer, a network-access layer, and a network-application layer are set. However, parameters of other layers may be set. Further, the classification of layers may vary with systems and/or applications.

Further, the wireless-communication apparatus according to the present embodiment may be a digital camera, a printer, a personal computer, etc.

Further, even though the wireless LANs of IEEE-802.11 series are used in the present embodiment, any other type of wireless-communication method may be used. Further, not only can parameters of the wireless communications be set, but also parameters of wired communications.

Thus, it becomes possible to easily determine whether the wireless-parameter setting should be performed according to the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-311617 filed on Nov. 17, 2006, which is hereby incorporated by reference herein in its entirety.

What is claimed is:

1. A management device comprising:
   a first acquisition unit configured to acquire identification information used to identify a wireless-communication apparatus from a portable storage medium;
   a second acquisition unit configured to acquire authentication information from the portable storage medium;
   a detecting unit configured to detect a request signal to acquire wireless parameters;

a search unit configured to search for the wireless-communication apparatus based on the acquired identification information;

a first processing unit to execute a wireless parameters setting processing for setting wireless parameters on a wireless-communication apparatus transmitting the request signal, based on the acquired authentication information and authentication information included in the detected request signal; and a second processing unit to execute an access parameters setting processing for setting access parameters used to access a second network from a first network, wherein the management device, in case that the first acquisition unit does not acquire the identification information, executes the wireless parameters setting processing and the access parameters setting processing, wherein the management device, in case that the first acquisition unit acquires the identification information and the search unit detects the wireless-communication apparatus corresponding to the acquired identification information, executes the access parameters setting processing without executing the wireless parameters setting processing.

2. The management device according to claim 1, further comprising:

a writing unit configured to write the identification information of the wireless-communication apparatus transmitting the request signal into the portable storage medium in case that the wireless parameters setting processing is successful.

3. The management device according to claim 1, further comprising a second writing unit configured to, in the access parameters setting processing, write the access parameters in the portable storage medium.

4. The management device according to claim 1, further comprising a second writing unit configured to write parameters used to access an application available on the second network from the first network in the portable storage medium.

5. The management device according to claim 1, further comprising a unit configured to, in the access parameters setting processing, acquire the access parameters from the portable storage medium and set the acquired access parameters on the wireless-communication apparatus that has transmitted the request signal.

6. The management device according to claim 1, further comprising a unit configured to acquire parameters used to access and application on the second network from the first network from the portable storage medium and transmitted to the wireless-communication apparatus that has transmitted the request signal.

7. A method of controlling a management device, the method comprising:

acquiring identification information used to identify a wireless-communication apparatus from a portable storage medium;

acquiring authentication information from the portable storage medium;

detecting a request signal to acquire the wireless parameters;

searching for the wireless-communication apparatus based on the acquired identification information;

executing a wireless parameters setting processing for setting wireless parameters on a wireless-communication apparatus transmitting the request signal, based on the acquired authentication information and authentication information included in the detected request signal; and executing an access parameters setting processing for setting access parameters used to access a second network from a first network, wherein the management device, in case that the identification information is not acquired, executes the wireless parameters setting processing and the access parameters setting processing, wherein the management device, in case that the identification information is acquired and the wireless-communication apparatus corresponding to the acquired identification information is detected, executes the access parameters setting processing without executing the wireless parameters setting processing.

8. A non-transitory computer-readable storage medium storing computer-executable process steps, the computer-executable process steps causing a computer to execute the method of claim 7.

9. The method according to claim 7, further comprising:

writing the identification information of the wireless-communication apparatus transmitting the request signal into the portable storage medium in case that the wireless parameters setting processing is successful.

10. The method to claim 7, further comprising writing, in the access parameters setting processing, the access parameters in the portable storage medium.

11. The method according to claim 7, further comprising writing parameters used to access an application available on the second network from the first network in the portable storage medium.

12. The method according to claim 7, further comprising acquiring, in the access parameters setting processing, the access parameters from the portable storage medium and set the acquired access parameters on the wireless-communication apparatus that has transmitted the request signal.

13. The method according to claim 1, further comprising acquiring parameters used to access and application on the second network from the first network from the portable storage medium and transmitted to the wireless-communication apparatus that has transmitted the request signal.

14. The non-transitory computer-readable storage medium according to claim 8, wherein the method further comprises:

writing the identification information of the wireless-communication apparatus transmitting the request signal into the portable storage medium result, in case that the wireless parameters setting processing is successful.

15. The non-transitory computer-readable storage medium according to claim 8, wherein the method further comprises writing, in the access parameters setting processing, the access parameters in the portable storage medium.

16. The non-transitory computer-readable storage medium according to claim 8, wherein the method further comprises writing parameters used to access an application available on the second network from the first network in the portable storage medium.

17. The non-transitory computer-readable storage medium according to claim 8, wherein the method further comprises acquiring, in the access parameters setting processing, the access parameters from the portable storage medium and set the acquired access parameters on the wireless-communication apparatus that has transmitted the request signal.

18. The non-transitory computer-readable storage medium according to claim 8, wherein the method further comprises acquiring parameters used to access and application on the second network from the first network from the portable storage medium and transmitted to the wireless-communication apparatus that has transmitted the request signal.

19. The management device according to claim 1, wherein a correspondence relationship between media access control (MAC) address and internet protocol (IP) address associated with the wireless-communication apparatus is managed by a management table.

20. The management device according to claim 1, wherein the second acquisition unit acquires the authentication information from the portable storage medium in case that the first acquisition unit does not acquires the identification information.

* * * * *